US009106481B2

(12) United States Patent
Taaghol et al.

(10) Patent No.: US 9,106,481 B2
(45) Date of Patent: Aug. 11, 2015

(54) DEVICE-TO-DEVICE TAPPING SERVICE LAYER

(71) Applicant: Intel Corporation, Santa Clara, CA (US)

(72) Inventors: Pouya Taaghol, San Jose, CA (US); Yosef Takserman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/734,714

(22) Filed: Jan. 4, 2013

(65) Prior Publication Data

US 2014/0195684 A1    Jul. 10, 2014
US 2014/0317290 A9    Oct. 23, 2014

(51) Int. Cl.
 *G06F 15/173* (2006.01)
 *H04L 29/08* (2006.01)
 *H04L 29/12* (2006.01)

(52) U.S. Cl.
 CPC .......... *H04L 29/08171* (2013.01); *H04L 67/10* (2013.01); *H04L 67/16* (2013.01); *H04L 67/18* (2013.01); *H04L 61/1511* (2013.01)

(58) Field of Classification Search
 USPC ....................................................... 709/226
 See application file for complete search history.

(56) References Cited

U.S. PATENT DOCUMENTS

| | | | |
|---|---|---|---|
| 2007/0086357 A1 | 4/2007 | Okmianski et al. | |
| 2009/0113088 A1* | 4/2009 | Illowsky et al. | 710/62 |
| 2010/0150120 A1* | 6/2010 | Schlicht et al. | 370/338 |
| 2010/0186079 A1 | 7/2010 | Nice et al. | |
| 2010/0302947 A1* | 12/2010 | Leppanen et al. | 370/241 |
| 2011/0307614 A1 | 12/2011 | Bernardi et al. | |
| 2012/0020300 A1 | 1/2012 | Sheriff et al. | |
| 2013/0159407 A1* | 6/2013 | Koskela et al. | 709/204 |

OTHER PUBLICATIONS

Webinos; "webinos phase I architecture and components"; FP7-ICT-2009-5 257103; webinos.org; Jun. 2011; 275 pages.*
International Search Report and Written Opinion mailed Nov. 23, 2012 from International Application No. PCT/US2012/031258.
Cheshire et al., "DNS-Based Service Discovery," Apple Inc., Internet Engineering Task Force, Internet-Draft, Standards Track, Dec. 9, 2011, 54 pages.
Gulbrandsen et al., "A DNS RR for specifying the location of services (DNS SRV)," Microsoft Corp., RFC 2782, Network Working Group, Standards Track, Feb. 2000, 13 pages.
International Preliminary Report on Patentability mailed Oct. 9, 2014 from International Application No. PCT/US2012/031258.

* cited by examiner

*Primary Examiner* — Richard G Keehn
(74) *Attorney, Agent, or Firm* — Schwabe, Williamson & Wyatt, P.C.

(57) ABSTRACT

Embodiments of the present disclosure describe device, methods, computer-readable media and system configurations for providing a device-to-device ("D2D") tapping service ("DTS") layer. In various embodiments, a DTS layer of a communication stack of a computing device may receive, from an application executing within an application layer of the communication stack, a request for a resource. In various embodiments, the DTS layer may determine whether the resource is available locally on the computing device. In various embodiments, the DTS layer may issue a domain name system ("DNS") request through a network layer of the communication stack to facilitate transparent access by the application to the resource on a remote computing device, where it is determined that the resource is unavailable locally on the computing device. Other embodiments may be described and/or claimed.

26 Claims, 6 Drawing Sheets

DEVICE-TO-DEVICE TAPPING SERVICE LAYER

CROSS REFERENCE TO RELATED APPLICATIONS

The present application claims priority under 35 U.S.C. §365(a) to International Application No. PCT/US2012/031258, filed Mar. 29, 2012, entitled "Device-To-Device Tapping Service Layer", which designates the United States of America, the entire content and disclosure of which is hereby incorporated by reference in its entirety.

FIELD

Embodiments of the present disclosure relate generally to the field of data processing, and more particularly, to a device-to-device ("D2D") tapping service ("DTS") layer.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

An average person may possess multiple computing devices such as mobile phones, laptop or tablet computers, desktop computers, digital cameras, printers, televisions, audio systems, and so on. These devices may have a variety of resources that may be accessible by applications executing locally on the computing devices, such as displays of varying sizes, sensors, global positioning system ("GPS") components, processors, storage capacity, speakers, wired and wireless interfaces, and so forth. However, these resources may not be available for sharing with other computing devices in a transparent or scalable way.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. As used herein, "computer-implemented method" may refer to any method executed by one or more processors, a computer system having one or more processors, a mobile device such as a smart phone (which may include one or more processors), a tablet, laptop computer, a set-top box, a gaming console, and so forth.

Figure 1:
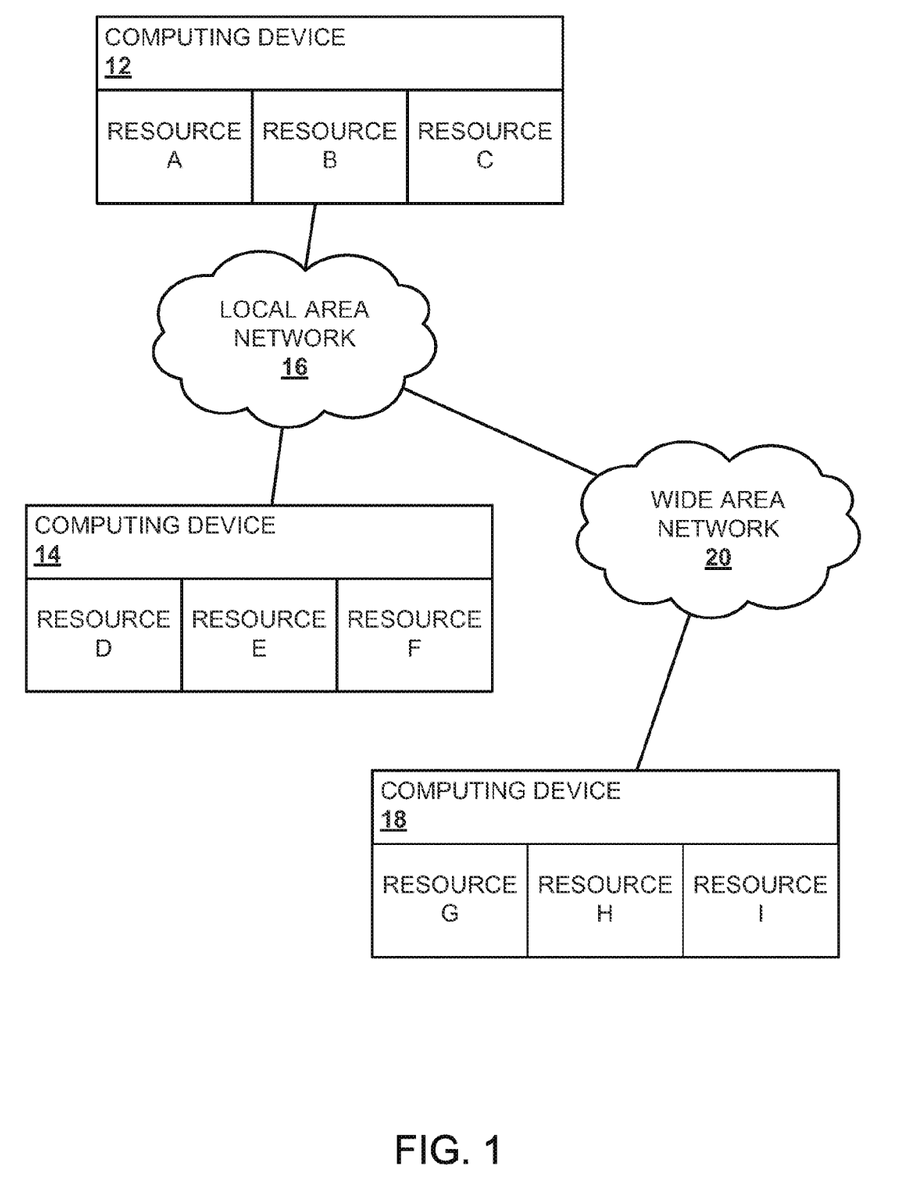
FIG. 1 schematically illustrates example computing devices with resources for sharing, as well as network connections therebetween, in accordance with various embodiments.

Referring now to FIG. 1, a first computing device 12 may have three resources, Resource A, Resource B and Resource C, available for sharing. A computing device may have more or less resources; three resources are shown here for illustrative purposes only. A second computing device 14 may include Resource D, Resource E and Resource F for sharing. Second computing device 14 may be in communication with first computing device 12 via a local area network 16. Local area network 16 may take various forms, such as a wireless network provided by a wireless access point (not shown), a wired network, or a combination of the two. A third computing device 18 may include Resource G, Resource H and Resource I for sharing. Third computing device 18 may be in communication with first and second computing devices 12 and 14 via a wide area network 20 such as the Internet.

Resources A-I may be various types of physical and/or logical resources found on various computing devices. They may include but are not limited to mice, keyboards, keypads, microphones, touch screen displays, fingerprint readers, scanners, retinal readers, microphones, cameras, wired and wireless displays, remote controls, light-emitting diodes ("LEDs"), printing devices, speakers, sensors (e.g., to measure temperature), gyroscopes, global positioning system ("GPS") components, compasses, storage capacity (e.g., hard drives, flash memory, RAM, ROM), processing power (e.g., processors, processor cores, chipsets, graphics processors), wired communication interfaces (e.g., Ethernet), wireless communication interfaces (e.g., antennas for sending/receiving WiMAX, LTE, BlueTooth, WiFi, etc.), simple messaging services ("SMS") interfaces, phone dialers, backhauling links (e.g., a mobile hotspot), secure execution environments, or any other resource that may be under the control of a computing device. Computing devices 12, 14 and 18 may be configured to implement techniques described herein to share resources such as Resources A-I.

Figure 2:
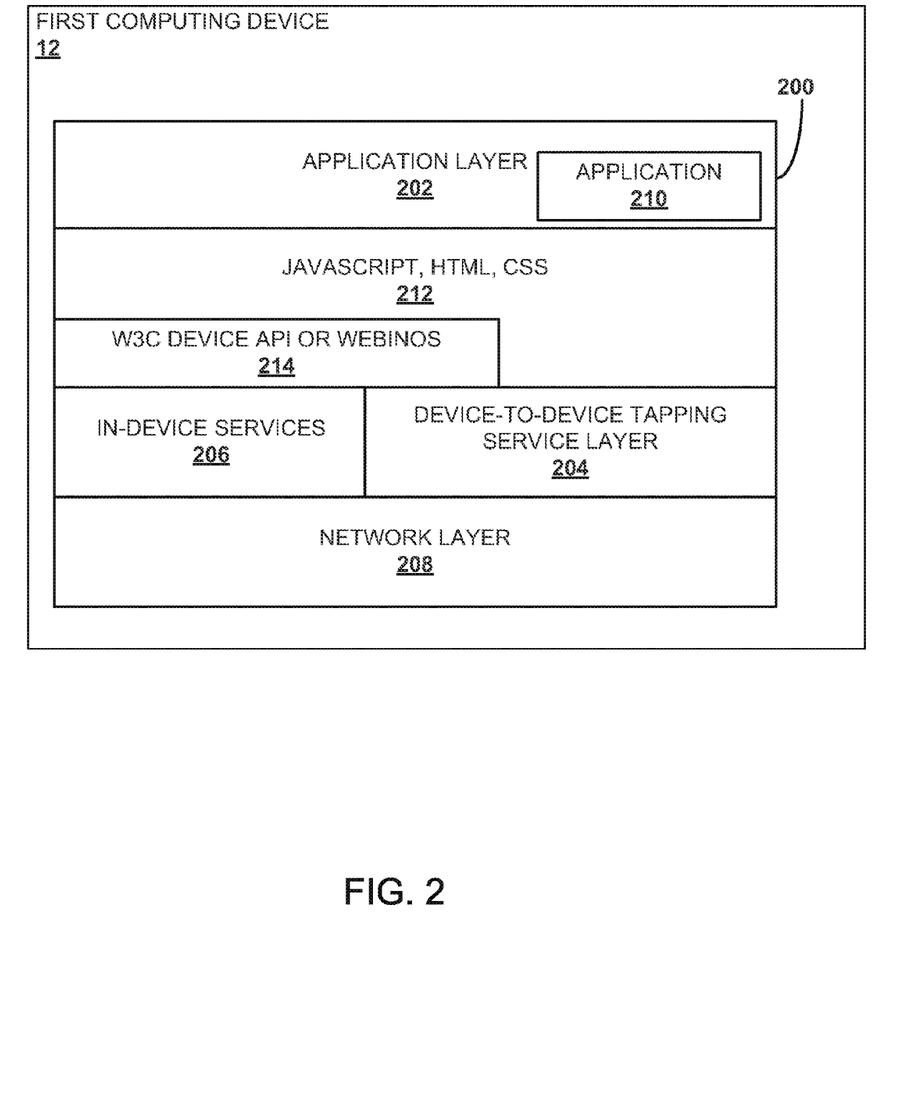
FIG. 2 depicts an example communication stack that may be implemented in devices with resources to share, in accordance with various embodiments.

Referring to FIG. 2, first computing device 12 may include a communication stack 200 that includes an application layer 202, a device-to-device ("D2D") tapping service ("DTS") layer 204, an in-device services layer 206, and a network layer 208. In-device services layer 206 may provide access to resources that are available locally on first computing device 12. DTS layer 204 may provide transparent access to resources that may not be available locally on first computing device 12. In various embodiments, DTS layer 204 may be at a lowest layer of communication stack 200 above network layer 208. In various embodiments, network layer 208 may include a network interface card driver. Other computing devices, such as second computing device 14 and third computing device 18, may include similar communication stacks.

For instance, assume an application 210 executing in application layer 202 seeks access to a resource. In various embodiments, application 210 may first request access to the resource from in-device services layer 206. In some embodiments, application 210 may instead direct the request to DTS layer 204, which may first inquire with in-device services layer 206 as to the availability of the requested resource locally. In either case, if the resource is available locally, in-device services layer 206 may provide access to the resource to application 210 or DTS layer 204. However, if the resource is not available locally at first computing device 12, then DTS layer 204 may be configured to locate the requested resource elsewhere on remote computing devices, and to provide transparent access to the resource to application 210. As used herein, "transparent access" may mean that, from a perspective of application 210, there may be little or no observable difference between when a resource is accessed locally or from a remote computing device.

Application 210 may request access to resources from DTS layer 204 and/or in-device services layer 206 in various ways. In various embodiments, DTS layer 204 may be exposed directly to application 210 via high-level programming, scripting or markup languages 212 such as JavaScript, hypertext markup language ("HTML") or cascading style sheets ("CSS"). In various embodiments, DTS layer 204 may be exposed to application 210 abstractly, e.g., with other device interfaces 214 such as a device application programming interface ("API") from the World Wide Web Consortium ("W3C"), or one or more Webinos. In various embodiments, application 210 may utilize a combination of technologies from both 212 and 214.

If it is determined, e.g., by DTS layer 204, that the resource sought by application 210 is not available on first computing device 12, then in various embodiments, DTS layer 204 may be configured to issue a request for the resource, e.g., through network layer 208 of communication stack 200. This request may be issued to remote computing devices such as second computing device 14 or third computing device 18. In various embodiments, DTS layer 204 may thereafter cooperate with a responsive remote computing device to provide application 210 transparent access to the resource.

In various embodiments, the request for the resource issued by DTS layer 204 may take the form of a domain name system ("DNS") request. For example, DTS layer 204 may generate a DNS Service Discovery ("DNS-SD") message that may include, for instance, a request for DNS SRV, TXT and/or PRT records, as described in Request for Comments 2782, published in February, 2000 by the Internet Engineering Task Force ("IETF"). As will be described below, this DNS request may be further formed by DTS layer 204 based on whether the resource is likely to be available on, or would be useful only if available on, a computing device within a vicinity of first computing device 12.

Figure 3:
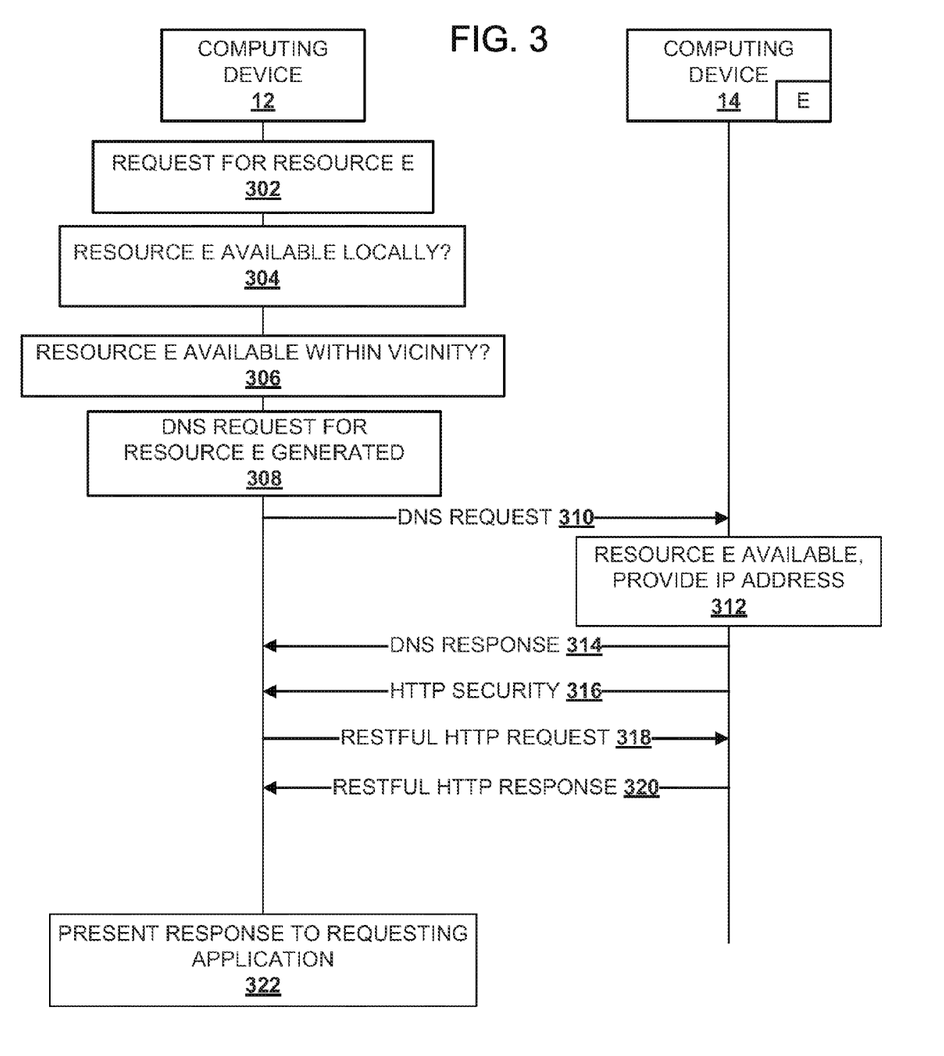
FIG. 3 schematically depicts an example resource sharing session, in accordance with various embodiments.

FIG. 3 depicts an example communication session between first computing device 12 and second computing device 14 of FIG. 1, in which they share a resource, Resource E, in accordance with various embodiments. Referring to both FIGS. 2 and 3, at 302 of FIG. 3, DTS layer 204 of first computing device 12 may receive, from application 210 executing within application layer 202 of first computing device 12, a request for Resource E. At 304, DTS layer 204 and/or in-device services layer 206 may determine whether Resource E is available locally on first computing device 12. For example, DTS layer 204 may query in-device services layer 206 to determine whether first computing device 12 includes Resource E.

If/when it is determined that Resource E is unavailable locally on first computing device 12, then at 306, DTS layer 204 may determine whether the requested resource is likely to be available on and/or would be useful only if available on another computing device within a vicinity of the computing device. Based on this determination, DTS layer 204 may issue the request for the resource accordingly.

For instance, if it is determined, e.g., by DTS layer 204, that it is likely a computing device within a vicinity of first computing device 12, such as second computing device 14, has Resource E, then at 308, DTS layer 204 may generate the DNS request in a multicast message. For example, DTS layer 204 may determine a likelihood that the requested resource is available on another computing device, such as second computing device 14, connected to a same local area network (e.g., local area network 16) as first computing device 12.

Additionally or alternatively, DTS layer 204 may determine that the resource would be useful only if available on a computing device within a vicinity of first computing device 12. Examples of such resources may include GPS devices, a microphone, a speaker, or a display on which to render visual output, none of which may be useful if obtained from a far-away computing device.

Whether it is determined that the resource is likely to be available within a vicinity or whether the resource would be useful only if available within the vicinity, at 308, DTS layer 204 may generate the DNS request in a multicast message. In various embodiments, the multicast message may be a multicast domain name service ("mDNS") message, e.g., using a known Internet Protocol ("IP") address such as 224.0.0.251.

If, on the other hand, it is determined at 306, e.g., by DTS layer 204, that the requested resource is not likely to be available on another computing device within a vicinity of the computing device, and/or the resource would be useful even if obtained from a more remote computing device, then at 308, DTS layer 204 may be configured to generate the DNS request for the resource in a unicast message.

Whether or not the resource is available within the vicinity, at 310, the DNS request may be transmitted through network layer 208. Multicast messages may be transmitted to computing devices within a vicinity of first computing device 12, such as computing devices of local area network 16. Unicast messages may be transmitted to a DNS server (not shown), which may forward requests to remote computing devices indicated in DNS records as having the requested resources. In various embodiments, a DNS server may discover and maintain DNS records for resources available on various computing devices, e.g., using technology such as DNS Update, which is defined in Request for Comments 2136, published in April, 1997 by the IETF. In various embodiments, updates to DNS resource records may be authenticated using technology such as Transaction Signature, or "TSIG," which is defined in Request for Comments 2845, published in May, 2000 by the IETF.

At 312, a remote computing device such as second computing device 14 may determine that the resource requested at 310 is available locally, as is the case in FIG. 1. In various embodiments, at 314, second computing device 14 may provide a DNS response indicating that it has the requested resource available for sharing. For example, the DNS response at 314 may be compliant with DNS-SD, and may include a service instance name, e.g., DNS SRV, TXT and/or PRT record associated with Resource E. In various embodiments, the DNS response may include a universal resource locator, or "URL," associated with the resource.

Once the resource is located, computing devices may share resources using a variety of protocols. In various embodiments, such as that shown in FIGS. 1-3, computing devices may be configured to facilitate access to resources by applications using the hypertext transport protocol ("HTTP"). In various embodiments, computing devices may be configured to share resources using a Web Services paradigm in which each computing device may act both as an HTTP client (e.g., when requesting a resource) and as an HTTP server (e.g., when providing access to a resource). In various embodiments, computing devices may coordinate in a manner compliant with representational state transfer ("REST") as described by the W3C in order to share resources. Thus, in various embodiments, computing devices (e.g., 12, 14, 18) may exchange Web Services communications that are "RESTful" in that they may conform to REST constraints.

In various embodiments, before sharing resources, at 316, DTS layer 204 may receive, from second computing device 14, HTTP security information. HTTP security information may include configuration data that first computing device 12 may use to access Resource E on second computing device 14. For example, HTTP security information may include digital certificates (e.g., X.609) or pre-shared keys that may be used to establish a secure HTTP session.

DTS layer 204 may then transmit, at 318, an HTTP request 316 seeking access to the resource offered by second computing device 14. The HTTP request at 318 may include a URL associated with the resource on second computing device 14. For example, if application 210 requests Resource E, then DTS layer 204 may include in the HTTP request a URL associated with Resource E: e.g., http://1.12.23.5/Resource_E. In various embodiments, the HTTP request may be RESTful. If it turns out the requested resource is not available on the responding computing device (e.g., Resource E has suddenly become unavailable), then second computing device 14 may send an HTTP response to first computing device 12 that redirects first computing device 12 to another computing device that has the resource available for sharing.

At 320, second computing device 14 may transmit, to first computing device 12, an HTTP response. In various embodiments, this HTTP response may also be RESTful. In various embodiments, the HTTP response may include data in the JavaScript Object Notation ("JSON") or eXtensible Markup Language ("XML") format that originates from and/or contains data related to the requested resource. For example, if Resource E on second computing device 14 is a GPS, then the RESTful HTTP response at 320 may contain geographic coordinates (e.g., a latitude and longitude) in an XML or JSON message. In various embodiments, DTS layer 204 of first computing device 12 may parse the received XML or JSON message and present it to the calling application 210 at 322, e.g., in the form of an API response.

The above-described example is not limiting, and is for illustrative purposes only. For some types of resources, the HTTP request at 318 and response at 320 may supersede and/or supplement the use of other protocols traditionally used for those resources. For example, printers traditionally use one or more of a number of printing protocols, e.g., line printer ("LPR"), the Internet Printing Protocol ("IPP"), AppSocket, PhaserPort, JetDirect, Page Description Language ("PDL"), Port 9100, and so forth. Using techniques described herein, and assuming Resource E is a printer, an application (e.g., 210) executing on first computing device 12 may submit a print job, and DTS layer 204 may submit a corresponding print job to second computing device 14 using HTTP at 318. In such case, the HTTP response at 320 may be a confirmation of printing success.

The HTTP request and response may include other types of information and make take various forms. For example, HTTP Live Streaming may be utilized if the shared resource is of a type that would require streaming. For example, Resource E may be a multimedia file such as an MP3 audio file or digital video. In such case, the HTTP request and response at 318-320 may be one or more HTTP Live Streaming protocol requests and responses in which the requested multimedia file is streamed from second computing device 14 to first computing device 12. As another example, Resource E may be a streaming source (e.g., an application that interfaces with an online streaming service) to which application 210 requests access. As another example, Resource E may be a communication interface on second computing device 14, such as a BlueTooth, 802.11, WiFi or other wired or wireless interface, through which first computing device 12 may stream data.

Streaming may also be utilized where first computing device 12 does not have hardware capable of rendering a particular type of file. For example, first computing device 12 may not have a display or may have a display that is incapable of displaying a particular visual file (e.g., 3D). Resource E may be a display that is capable of displaying the visual file. After determining that second computing device 14 has Resource E available for sharing, DTS layer 204 on first computing device 12 may use the HTTP Live Streaming protocol to stream the visual file to second computing device 14, where second computing device 14 may render the visual file on its display (Resource E). First computing device 12 and second computing device 14 may share other types of output components, such as speakers or tactile feedback devices, where one or the other does not have an appropriate output component for a particular type of file.

Figure 4:
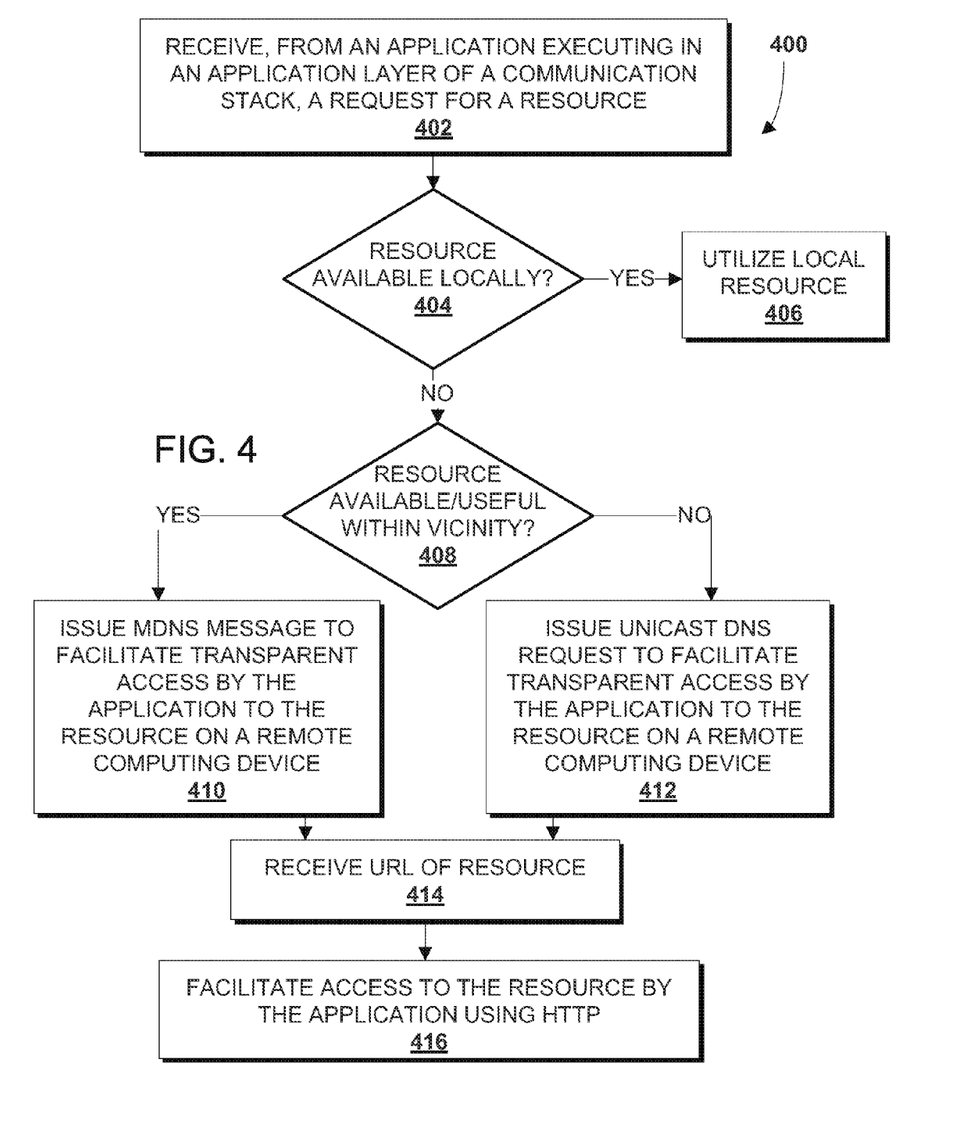
FIG. 4 depicts an example method that may be implemented on a computing device to utilize a resource on a remote computing device, in accordance with various embodiments.

FIG. 4 depicts an example method 400 that may be implemented by various computing devices described herein, such as first computing device 12, second computing device 14 or third computing device 18. At block 402, a request for access to a resource may be received, e.g., by in-device services layer 206 and/or DTS layer 204 of first computing device 12, from an application such as application 210.

At block 404, it may be determined, e.g., by in-device services layer 206 and/or DTS layer 204, whether the resource requested is available locally, e.g., on first computing device 12. If the answer is yes (e.g., as may be indicated by in-device services layer 206), then at 406, application 210 may utilize the local resource using traditional means (e.g., device API, etc.).

However, if the resource is not available locally, then at 408, it may be determined, e.g., by DTS layer 204, whether the resource is likely to be available and/or would be useful only if available within a particular vicinity of a computing device executing the requesting application, such as first computing device 12.

If it is determined, e.g., by DTS layer 204, that the resource is likely to be available or would be useful only if available on another computing device within a vicinity of the computing device, then at block 410, a request for the resource may be issued, e.g., by DTS layer 204, to computing devices within vicinity using a multicast (e.g., mDNS) message. Otherwise, at block 412, the request for the resource may be issued, e.g., by DTS layer 204, to computing devices outside of the vicinity, e.g., to a DNS server in a unicast DNS message.

Either way, at block 414, an identifier associated with the resource (e.g., URL, service instance name) may be received, e.g., via network layer 208 of first computing device 12. At block 416, access to the resource by the requesting application (e.g., application 210) may be facilitated, e.g., by DTS layer 204. For example, as described above, DTS layer 204 may use HTTP to access the resource, and may parse an HTTP response for presentation to application 210, e.g., in the form of an API response.

Figure 5:
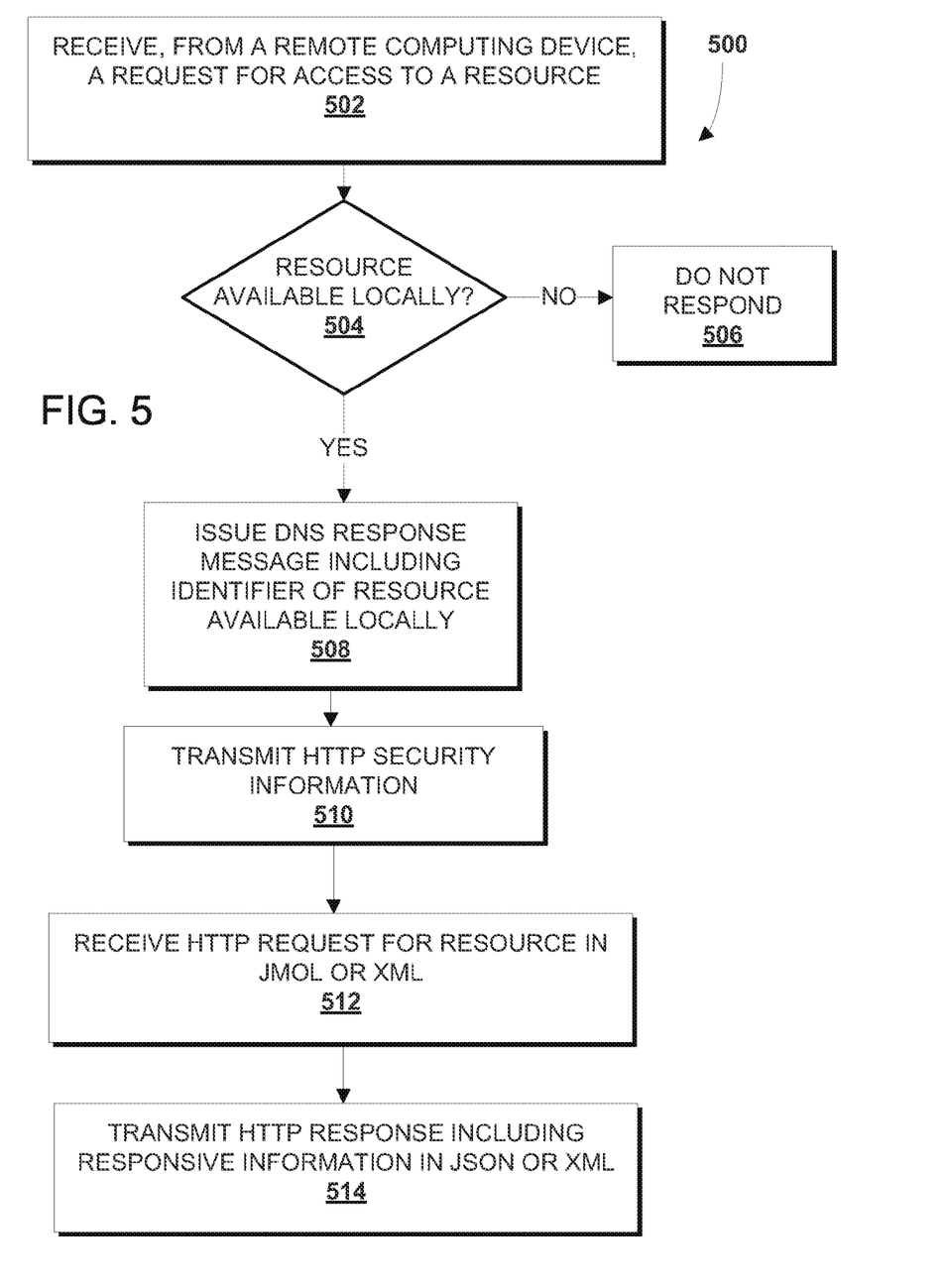
FIG. 5 depicts an example method that may be implemented on a computing device to share a local resource with a remote computing device, in accordance with various embodiments.

FIG. 5 depicts an example method 500 that may be implemented on computing devices such as first computing device 12, second computing device 14 and third computing device 18 to respond to requests for access to resources from other computing devices. For example, if the method 400 of FIG. 4 is performed by first computing device 12, method 500 of FIG. 5 may be performed by other computing devices that are remotely disposed from first computing device 12, such as second computing device 14 or third computing device 18.

At block 502, a request for access to a resource may be received, e.g., by second computing device 14. At block 504, it may be determined, e.g., by a DTS layer in second computing device 14, whether the resource is available locally. If not, then at block 506, second computing device 14 may not respond. However, if the requested resource is available locally on second computing device, then at block 508, a DNS response may be issued, e.g., by second computing device 14, that may include an identifier (e.g., a URL, service instance name) of the resource on second computing device 14.

At block 510, HTTP security information, e.g., whether the resource can only be accessed using secure means, may be transmitted, e.g., by second computing device 14, to the requesting computing device. At block 512, an HTTP request for the resource may be received, e.g., by second computing device 14, which may be in various formats such as JMOL or XML. At block 514, an HTTP response, e.g., in JMOL or XML format, containing information pertinent to the requested resource (e.g., geographic coordinates from a GPS) may be transmitted, e.g., by second computing device 14, to the requesting computing device.

Figure 6:
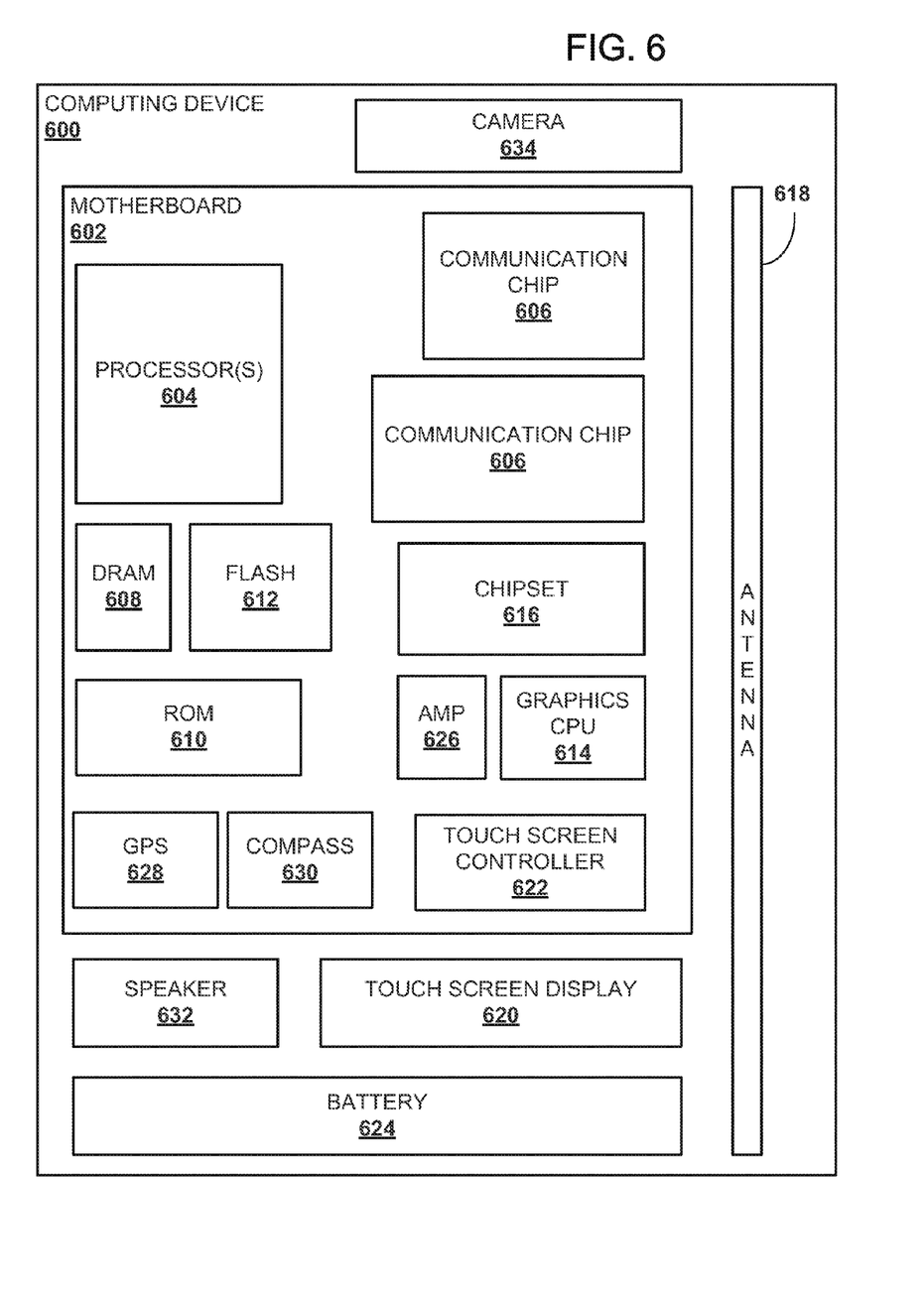
FIG. 6 schematically depicts an example computing device on which disclosed techniques such as the methods of FIGS. 4 and 5 may be implemented, in accordance with various embodiments.

FIG. 6 illustrates a computing device 600 in accordance with various embodiments. The computing device 600 houses a board 602. The board 602 may include a number of components, including but not limited to a processor 604 and at least one communication chip 606. The processor 604 may be physically and electrically coupled to the board 602. In various embodiments, the at least one communication chip 606 may also be physically and electrically coupled to the board 602. In further implementations, the communication chip 606 may be part of the processor 604.

Depending on its applications, computing device 600 may include other components that may or may not be physically and electrically coupled to the board 602. These other components include, but are not limited to, volatile memory (e.g., DRAM 608), non-volatile memory (e.g., ROM 610), flash memory 612, a graphics processor 614, a digital signal processor (not shown), a crypto processor (not shown), a chipset 616, an antenna 618, a display (not shown), a touch screen display 620, a touch screen controller 622, a battery 624, an audio codec (not shown), a video codec (not shown), a power amplifier 626, a global positioning system ("GPS") device 628, a compass 630, an accelerometer (not shown), a gyroscope (not shown), a speaker 632, a camera 634, and a mass storage device (such as hard disk drive, compact disk ("CD"), digital versatile disk ("DVD"))(not shown), and so forth.

In various embodiments, volatile memory (e.g., DRAM 608), non-volatile memory (e.g., ROM 610), flash memory 612, and the mass storage device may include programming instructions configured to enable computing device 600, in response to execution by processor(s) 604, to practice all or selected aspects of method 400 and/or 500.

The communication chip 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM, GPRS, CDMA, TDMA, DECT, Bluetooth, derivatives thereof, as well as any other wireless protocols that are designated as 3 G, 4 G, 5 G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 may include an integrated circuit die packaged within the processor 604. In various embodiments, the integrated circuit die of the processor 604 may include one or more devices, such as transistors or metal interconnects, that are formed to facilitate resource sharing using one or more techniques described herein. The term "processor" may refer to any device or portion of a device that processes electronic data from registers and/or memory to transform that electronic data into other electronic data that may be stored in registers and/or memory.

The communication chip 606 may also include an integrated circuit die packaged within the communication chip 606. In various embodiments, the integrated circuit die of the communication chip 606 may include one or more devices, such as transistors or metal interconnects, that are formed to facilitate resource sharing using one or more techniques described herein.

In various implementations, the computing device 600 may be a laptop, a netbook, a notebook, an ultrabook, a smart phone, a tablet, a personal digital assistant ("PDA"), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

The following paragraphs describe various embodiments. In various embodiments, a device-to-device ("D2D") tapping service ("DTS") layer of a communication stack of a computing device may receive, from an application executing within an application layer of the communication stack, a request for a resource. In various embodiments, the DTS layer may determine whether the resource is available locally on the computing device. In various embodiments, the DTS layer may issue a domain name system ("DNS") request through a network layer of the communication stack to facilitate transparent access by the application to the resource on a remote computing device, where it is determined that the resource is unavailable locally on the computing device.

In various embodiments, the DTS layer may receive, through the network layer, in response to the DNS request, a universal resource locator or a service instance name associated with the resource on the remote computing device.

In various embodiments, the DTS layer may determine whether the resource would be useful only if available on another computing device within a vicinity of the computing device. In various embodiments, the DTS layer may transmit the DNS request for the resource in a multicast message, based on said determining that the resource would be useful only if available on another computing device within a vicinity of the computing device. In various embodiments, the DTS layer may determine a likelihood of whether the resource is available on another computing device within a vicinity of the computing device. In various embodiments, determining the likelihood may include determining, by the DTS layer, a likelihood of whether the resource is available on another computing device connected to a same local area network as the computing device.

In various embodiments, the DTS layer may determine, based on a comparison of the likelihood to a predetermined threshold, the resource is likely to be available on another computing device within a vicinity of the computing device. In various embodiments, the DTS layer may transmit the DNS request for the resource in a multicast message based on said determining that the resource is likely to be available on another device within a vicinity of the computing device. In various embodiments, the multicast message may be a multicast domain name service ("mDNS") message.

In various embodiments, the DTS layer may determine, based on a comparison of the likelihood to a predetermined threshold, the resource is unlikely to be available on another computing device within a vicinity of the computing device. In various embodiments, the DTS layer may transmit, to a DNS server, the DNS request for the resource in a unicast message, based on said determining that the resource is unlikely to be available on another computing device within a vicinity of the computing device.

In various embodiments, the DTS layer may facilitate access to the resource by the application using the hypertext transport protocol ("HTTP"). In various embodiments, facilitating access to the resource by the application using HTTP may include facilitating access to the resource by the application using secure HTTP.

In various embodiments, the resource may be a global positioning unit, an electronic display, a digital camera and/or a keyboard.

In various embodiments, the DTS layer may receive, from another remote computing device, a request for a second resource. In various embodiments, the DTS layer may determine whether the second resource is available locally on the computing device. In various embodiments, the DTS layer may facilitate access by the another remote computing device to the resource of the computing device. In various embodiments, receiving the request for the second resource may include receiving a multicast DNS message.

Computer-readable media (including non-transitory computer-readable media), methods, systems and devices for performing the above-described techniques are illustrative examples of embodiments disclosed herein.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A computer-implemented method, comprising:
receiving, by a device-to-device ("D2D") tapping service ("DTS") layer of a communication stack of a computing device, from an application executing within an application layer of the communication stack, a request for a resource;
determining, by the DTS layer, whether the resource is locally resident on the computing device;
determining, by the DTS layer, whether the resource would be useful to the application or a user of the computing device only if available on another computing device within a non-remote physical proximity of the computing device; and
issuing, by the DTS layer, a domain name system ("DNS") request through a network layer of the communication stack to facilitate transparent access by the application to the resource on a remote computing device, wherein the issuing is in response to a determination that the resource is not locally resident on the computing device and is further in response to a determination that the resource would be useful only if available on another computing device within the non-remote physical proximity of the computing device.

2. The computer-implemented method of claim 1, further comprising receiving, by the DTS layer through the network layer, in response to the DNS request, a universal resource locator or a service instance name associated with the resource on the remote computing device.

3. The computer-implemented method of claim 1, further comprising transmitting, by the DTS layer, the DNS request for the resource in a multicast message based on said determining that the resource would be useful only if available on another computing device within the non-remote physical proximity of the computing device.

4. The computer-implemented method of claim 3, further comprising facilitating, by the DTS layer, access to the resource by the application using the hypertext transport protocol ("HTTP").

5. The computer-implemented method of claim 4, wherein facilitating access to the resource by the application using HTTP includes facilitating access to the resource by the application using secure HTTP.

6. The computer-implemented method of claim 1, further comprising determining, by the DTS layer, a likelihood of whether the resource is available on another computing device within the non-remote physical proximity of the computing device.

7. The computer-implemented method of claim 6, wherein determining the likelihood includes determining, by the DTS layer, a likelihood of whether the resource is available on another computing device connected to a same local area network as the computing device.

8. The computer-implemented method of claim 6, further comprising:
    determining, by the DTS layer, based on a comparison of the likelihood to a predetermined threshold, the resource is likely to be available on another computing device within the non-remote physical proximity of the computing device; and
    transmitting, by the DTS layer, the DNS request for the resource in a multicast message based on said determining that the resource is likely to be available on another device within the non-remote physical proximity of the computing device.

9. The computer-implemented method of claim 8, wherein the multicast message is a multicast domain name service ("mDNS") message.

10. The computer-implemented method of claim 6, further comprising:
    determining, based on a comparison of the likelihood to a predetermined threshold, the resource is unlikely to be available on another computing device within the non-remote physical proximity of the computing device; and
    transmitting, to a DNS server, the DNS request for the resource in a unicast message based on said determining that the resource is unlikely to be available on another computing device within the non-remote physical proximity of the computing device.

11. The computer-implemented method of claim 1, wherein the resource is a global positioning unit, an electronic display, a digital camera or a keyboard.

12. The computer-implemented method of claim 1, further comprising:
    receiving, by the DTS layer, from another remote computing device, a request for a second resource;
    determining, by the DTS layer, whether the second resource is available locally on the computing device; and
    facilitating, by the DTS layer, access by the another remote computing device to the resource of the computing device.

13. The computer-implemented method of claim 12, wherein receiving the request for the second resource includes receiving a multicast DNS message.

14. The computer-implemented method of claim 1, wherein the DTS layer is located between an application layer of the communication stack and a network layer of the communication stack.

15. The computer-implemented method of claim 1, wherein the application is a first application, the request is a first request, the resource is a first resource, and further comprising:
    receiving, by the DTS layer, from a second application executing within the application layer, a second request for a second resource;
    determining, by the DTS layer, that the second resource is available locally on the computing device; and
    facilitating, by the DTS layer and based on the determination that the second resource is available locally on the computing device, utilization of the second resource by the second application without accessing the network layer.

16. At least one non-transitory machine-readable medium comprising a plurality of instructions that in response to being executed on a computing device, enable the computing device to provide:
    an application layer with an application executing therein;
    a network layer; and
    a device-to-device ("D2D") tapping service ("DTS") layer between the application layer and the network layer, the DTS layer configured to:
        receive a first request for a resource from the application;
        determine the requested resource is not locally resident on the computing device;
        determine a likelihood that the resource is available on another computing device within a non-remote physical proximity of the computing device;
        transmit a second request for the resource through the network layer to one or more remote computing devices, wherein the transmission of the second request is in response to the determination that the resource is not locally resident on the computing device and further in response to a determination of the likelihood that the resource is available on another computing device within a non-remote physical proximity of the computing device; and
        provide the application transparent access to the resource on the one or more remote computing devices using hypertext transport protocol ("HTTP").

17. The at least one non-transitory machine-readable medium of claim 16, wherein the application sends the first request for the resource to the DTS layer using Javascript, HTML or CSS.

18. The at least one non-transitory machine-readable medium of claim 16, wherein the instructions, when executed by the computing device, further enable the DTS layer to provide the application executing at the application layer access to the resource via a World Wide Web Consortium device application programming interface or a Webino.

19. The at least one non-transitory machine-readable medium of claim 16, wherein the second request for the resource comprises a DNS request.

20. The at least one non-transitory machine-readable medium of claim 16, wherein the instructions, when executed by the computing device, further enable the DTS layer to:
    receive, from another computing device through the network layer, a request for access to a second resource;
    determine whether the second resource is locally resident on the computing device; and
    provide, to the another computing device, access to the second resource where it is determined that the second resource is locally resident on the computing device.

21. The at least one non-transitory machine-readable medium of claim 20, wherein the instructions, when executed by the computing device, further enable the DTS layer to transmit, to the another computing device through the network layer, a universal resource locator associated with the second resource.

22. The at least one non-transitory machine-readable medium of claim 16, wherein the instructions, when executed by the computing device, further enable the DTS layer to determine whether the resource would be useful only if available on another computing device within a non-remote physical proximity of the computing device.

23. The at least one non-transitory machine-readable medium of claim 22, wherein the instructions, when executed by the computing device, further enable the DTS layer to transmit the DNS request for the resource in a multicast message where it is determined that the resource would be useful only if available on another computing device within the non-remote physical proximity of the computing device.

24. The at least one non-transitory machine-readable medium of claim 22, wherein the instructions, when executed by the computing device, further enable the DTS layer to:
    transmit a DNS request for the resource in a multicast domain name service ("mDNS") message where it is determined that the resource would be useful only if available on another computing device within the non-remote physical proximity of the computing device or the resource is likely to be available on another device within the non-remote physical proximity of the computing device.

25. The at least one non-transitory machine-readable medium of claim 16, wherein the instructions, when executed by the computing device, further enable the DTS layer to determine a likelihood of whether the resource is available on another computing device connected to a same local area network as the computing device.

26. The at least one non-transitory machine-readable medium of claim 16, wherein the instructions, when executed by the computing device, further enable the DTS layer to:
    determine, based on a comparison of the likelihood to a predetermined threshold, the resource is unlikely to be available on another computing device within the non-remote physical proximity of the computing device; and
    transmit, to a DNS server, the DNS request for the resource in a unicast message where it is determined that the resource is unlikely to be available on another computing device within the non-remote physical proximity of the computing device.

* * * * *